(12) United States Patent
Lopez et al.

(10) Patent No.: US 11,811,573 B2
(45) Date of Patent: Nov. 7, 2023

(54) P MATRICES FOR EHT

(71) Applicant: Telefonaktiebolaget LM Ericsson (publ), Stockholm (SE)

(72) Inventors: Miguel Lopez, Solna (SE); Leif Wilhelmsson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/640,384

(22) PCT Filed: Sep. 16, 2019

(86) PCT No.: PCT/EP2019/074736
§ 371 (c)(1),
(2) Date: Mar. 4, 2022

(87) PCT Pub. No.: WO2021/052562
PCT Pub. Date: Mar. 25, 2021

(65) Prior Publication Data
US 2022/0345348 A1      Oct. 27, 2022

(51) Int. Cl.
*H04B 7/0413*      (2017.01)
*H04L 27/26*       (2006.01)
(Continued)

(52) U.S. Cl.
CPC ......... *H04L 27/2626* (2013.01); *H04B 7/068* (2013.01); *H04L 25/0391* (2013.01); *H04B 7/0413* (2013.01)

(58) Field of Classification Search
CPC ............ H04L 27/2626; H04L 25/0391; H04B 7/0413; H04B 7/068
See application file for complete search history.

(56) References Cited

U.S. PATENT DOCUMENTS 8,897,393 B1    11/2014  Zhang et al.
2008/0186212 A1  8/2008  Clerckx et al.
(Continued)

FOREIGN PATENT DOCUMENTS

| CA | 2731210 A1 | 2/2010 |
| JP | 2017519407 A | 7/2017 |
| KR | 101612103 B1 | 4/2016 |

OTHER PUBLICATIONS

"Impacts of OCC on UL DM RS for LTE-A", 3GPP TSG RAN WG1 Meeting #60, R1-101075, San Francisco, USA, Feb. 22-26, 2010, pp. 1-7.
(Continued)

*Primary Examiner* — Rahel Guarino
(74) *Attorney, Agent, or Firm* — Murphy, Bilak & Homiller, PLLC (57) ABSTRACT

Methods and apparatus are provided. In an example aspect, a method of transmitting a multicarrier symbol comprising a plurality of subcarriers simultaneously from a plurality of antennas is provided. Each subcarrier is associated with a respective orthogonal matrix. The method comprises transmitting the symbol from the plurality of antennas such that, for each antenna, the symbol transmitted from each subcarrier is multiplied by an element of a respective row of the matrix associated with the subcarrier, wherein the row is associated with the antenna. The matrices are selected such that from each antenna, the symbol transmitted from at least one subcarrier is multiplied by a non-zero element, and the symbol transmitted from at least one other subcarrier is multiplied by a zero element.

21 Claims, 8 Drawing Sheets

---

Transmitting the symbol from the plurality of antennas such that, for each antenna, the symbol transmitted from each subcarrier is multiplied by an element of a respective row of the matrix associated with the subcarrier, wherein the row is associated with the antenna, wherein matrices are selected such that from each antenna, the symbol transmitted from at least one subcarrier is multiplied by a non-zero element, and the symbol transmitted from at least one other subcarrier is multiplied by a zero element ⟶ 502

500

(51) Int. Cl.
  *H04B 7/06* (2006.01)
  *H04L 25/03* (2006.01)

(56) References Cited

U.S. PATENT DOCUMENTS

2010/0086080 A1* 4/2010 Zhu .................... H04L 27/2601
  375/295
2015/0326408 A1 11/2015 Vermani et al.

OTHER PUBLICATIONS

"Remarks on P matrices for EHT", IEEE S02.11-19/1555r0, Sep. 2019, pp. 1-15.
"Part 11: Wireless LAN Medium Access Control (MAC) and Physical Layer (PHY) Specifications", IEEE Std 802.11™—2016 (Revision of IEEE Std 802.11—2012), IEEE Standard for Information technology—Telecommunications and information exchange between systems Local and metropolitan area networks—Specific requirements, IEEE Computer Society, Dec. 7, 2016, pp. 1-3534.
Liang, Dandan, et al., "EHT P matrices Discussion", IEEE 802.11-19/1980r1, Jan. 9, 2020, pp. 1-12.
Lopez, Miguel, et al., "Orthogonal Cover Code Design for 802.11be Extremely High Throughput WLANS", IEEE Asilomar, 2019, pp. 655-659.
Lopez, Miguel, et al., "P matrices to support more than S TX chains", IEEE 802.11-19/1910r1, Nov. 7, 2019, pp. 1-26.

* cited by examiner

Transmitting the symbol from the plurality of antennas such that, for each antenna, the symbol transmitted from each subcarrier is multiplied by an element of a respective row of the matrix associated with the subcarrier, wherein the row is associated with the antenna, wherein matrices are selected such that from each antenna, the symbol transmitted from at least one subcarrier is multiplied by a non-zero element, and the symbol transmitted from at least one other subcarrier is multiplied by a zero element ⎯⎯ 502

Transmitting the symbol from the plurality of antennas such that, for each antenna, the symbol transmitted from each subcarrier is multiplied by an element of a respective column of the matrix associated with the subcarrier, wherein the column is associated with the antenna, wherein matrices are selected such that from each antenna, the symbol transmitted from at least one subcarrier is multiplied by a non-zero element, and the symbol transmitted from at least one other subcarrier is multiplied by a zero element ⎯⎯ 512

P MATRICES FOR EHT

TECHNICAL FIELD

Examples of the present disclosure relate to transmitting a symbol, such as for example comprising a plurality of subcarriers from a plurality of antennas.

BACKGROUND

Advanced antenna systems may be used to significantly enhance performance of wireless communication systems in both uplink (UL) and downlink (DL) directions. For example, advanced antennas may provide the possibility of using the spatial domain of the channel to improve reliability and/or throughput of transmissions, for example by transmitting using multiple spatial streams (also referred to as space time streams).

The 802.11-16 standard, for example, specifies a set of matrices, often called P matrices, where the rows (and columns) define a set of orthogonal vectors that are employed as orthogonal cover codes for channel and pilot estimation when utilizing more than one space time stream (e.g. un multiple-input multiple-output, MIMO, operation). Rows or columns of these P matrices may be applied to the Long Training Field (LTF) and to pilots embedded in data symbols when transmitted.

When an 802.11 system operates in Multiple-Input Multiple-Output (MIMO) mode (e.g. Single User SU-MIMO or Multi-User MU-MIMO), a number $N_{LTF}$ of Long Training Fields (LTFs) are included in the physical layer preamble of a packet. A receiver having $N_{RX}$ receive antennas may generate an estimate $\hat{H}_k$ of the frequency domain channel matrix $H_k$ corresponding to the subcarrier k as follows:

$$\hat{H}_K = \frac{R \cdot P^H}{LTF_k \cdot N_{LTF}},$$

where P is the P matrix, $R=[\vec{R}_{k,1}, \ldots, \vec{R}_{k,N_{LTF}}]$ is a matrix of dimension $N_{RX} \times N_{LTF}$ that collects the received signal vectors $\vec{R}_{k,n}$ corresponding to the k-th subcarrier and n-th LTF symbol, and $LTF_k$ is the frequency domain LTF symbol corresponding to the k-th subcarrier.

SUMMARY

One aspect of the present disclosure provides a method of transmitting a multicarrier symbol comprising a plurality of subcarriers simultaneously from a plurality of antennas. Each subcarrier is associated with a respective orthogonal matrix. The method comprises transmitting the symbol from the plurality of antennas such that, for each antenna, the symbol transmitted from each subcarrier is multiplied by an element of a respective row of the matrix associated with the subcarrier, wherein the row is associated with the antenna. The matrices are selected such that from each antenna, the symbol transmitted from at least one subcarrier is multiplied by a non-zero element, and the symbol transmitted from at least one other subcarrier is multiplied by a zero element.

Another aspect of the present disclosure provides a method of transmitting a multicarrier symbol comprising a plurality of subcarriers simultaneously from a plurality of antennas. Each subcarrier is associated with a respective orthogonal matrix. The method comprises transmitting the symbol from the plurality of antennas such that, for each antenna, the symbol transmitted from each subcarrier is multiplied by an element of a respective column of the matrix associated with the subcarrier, wherein the row is associated with the antenna. The matrices are selected such that from each antenna, the symbol transmitted from at least one subcarrier is multiplied by a non-zero element, and the symbol transmitted from at least one other subcarrier is multiplied by a zero element.

A further aspect of the present disclosure provides apparatus for transmitting a multicarrier symbol comprising a plurality of subcarriers simultaneously from a plurality of antennas. Each subcarrier is associated with a respective orthogonal matrix. The apparatus comprises a processor and a memory. The memory contains instructions executable by the processor such that the apparatus is operable to transmit the symbol from the plurality of antennas such that, for each antenna, the symbol transmitted from each subcarrier is multiplied by an element of a respective row of the matrix associated with the subcarrier, wherein the row is associated with the antenna. The matrices are selected such that from each antenna, the symbol transmitted from at least one subcarrier is multiplied by a non-zero element, and the symbol transmitted from at least one other subcarrier is multiplied by a zero element A still further aspect of the present disclosure provides apparatus for transmitting a multicarrier symbol comprising a plurality of subcarriers simultaneously from a plurality of antennas. Each subcarrier is associated with a respective orthogonal matrix. The apparatus comprises a processor and a memory. The memory contains instructions executable by the processor such that the apparatus is operable to transmit the symbol from the plurality of antennas such that, for each antenna, the symbol transmitted from each subcarrier is multiplied by an element of a respective column of the matrix associated with the subcarrier, wherein the row is associated with the antenna. The matrices are selected such that from each antenna, the symbol transmitted from at least one subcarrier is multiplied by a non-zero element, and the symbol transmitted from at least one other subcarrier is multiplied by a zero element.

An additional aspect of the present disclosure provides apparatus for transmitting a multicarrier symbol comprising a plurality of subcarriers simultaneously from a plurality of antennas. Each subcarrier is associated with a respective orthogonal matrix. The apparatus is operable to transmit the symbol from the plurality of antennas such that, for each antenna, the symbol transmitted from each subcarrier is multiplied by an element of a respective row of the matrix associated with the subcarrier, wherein the row is associated with the antenna. The matrices are selected such that from each antenna, the symbol transmitted from at least one subcarrier is multiplied by a non-zero element, and the symbol transmitted from at least one other subcarrier is multiplied by a zero element.

Another aspect of the present disclosure provides apparatus for transmitting a multicarrier symbol comprising a plurality of subcarriers simultaneously from a plurality of antennas. Each subcarrier is associated with a respective orthogonal matrix. The apparatus is operable to transmit the symbol from the plurality of antennas such that, for each antenna, the symbol transmitted from each subcarrier is multiplied by an element of a respective column of the matrix associated with the subcarrier, wherein the row is associated with the antenna. The matrices are selected such that from each antenna, the symbol transmitted from at least one subcarrier is multiplied by a non-zero element, and the symbol transmitted from at least one other subcarrier is multiplied by a zero element.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Examples of this disclosure make use of certain types of orthogonal matrices. What follows is a review of some relevant definitions and properties. (±1)-matrices are matrices whose entries are restricted to the values $\{-1, +1\}$. Likewise, a (±1,0)-matrix has all its entries in the set $\{-1, +1, 0\}$. A square matrix M of dimensions n×n is an orthogonal matrix if $M \cdot M^H = \alpha I_n$. Here the superscript $(.)^H$ denotes Hermitian matrix transpose, $I_n$ is the identity matrix of dimension n×n and $\alpha$ is a positive constant. It can also be said that M has order n. It is known that if M is an orthogonal (±1)-matrix of order n, then n is either 1, 2 or is an even number divisible by 4 (i.e. n=1, 2, 4, 8, 12, 16, . . . ). Consequently, there do not exist orthogonal (±1)-matrices of orders 10 and 14. A so-called conference matrix or C-matrix of order n is an orthogonal (±1,0)-matrix that has zeros along the diagonal and all the other elements are ±1. Conference matrices are known to exist for orders 10 and 14, and it can be shown that an orthogonal (±1,0)-matrix of order n cannot have fewer than n zeros.

It can be verified that the orthogonality property of a (±1,0)-matrix is preserved by the following operations:

Operation 1: Negation of a row or column.

Operation 2: Permutation (i.e. swapping) of any two rows or any two columns.

EHT (Extremely High Throughput) has been proposed as an enhancement of the IEEE 802.11 standard. In particular, EHT may provide support for up to 16 space-time streams. Hence, there is interest in P matrices of orders 9≤n≤16.

EHT also proposes to increase the channel bandwidth to 320 MHz, as well as multi-link operation. With multi-link, the total aggregated bandwidth using several channels could exceed 1 GHz. Since the subcarrier spacing is 78.125 kHz, this means that it might be necessary to estimate about 12800 channel matrices, and since each channel matrix estimation requires the multiplication of two matrices, around 12800*16=204800 P matrix-vector multiplications could be needed at the receiver in order to estimate the channel. In the case of MU-MIMO, an 802.11ac/ax receiver often estimates the channel for all transmitted spatial streams, in order to perform cancellation of inter-stream interference.

This means that a receiver with $N_{RX}$ receive antennas would need to perform $N_{RX}$ times the multiplication of the full P matrix with a vector of received samples. In other words, even stations with few receive antennas may need to perform many P matrix-vector multiplications.

A straightforward way to design the new P matrices is to use DFT matrices. However, IEEE 802.11 has traditionally favored P matrices consisting only of +1's and −1's, because it reduces the computational complexity and/or memory usage at both the transmitter and receiver, and it enables efficient hardware implementations, since only additions are necessary. For example, for 3 or 7 space time streams, the 802.11 standard utilizes P matrices of dimensions 3×4 and 7×8 respectively, which are in fact sub-matrices of the (±1)-P matrices of order 4 and 8, even though certain overhead is introduced. Indeed, smaller 3×3 and 7×7 DFT matrices would have been suitable, but are not (±1)-P matrices.

Therefore, P matrices of dimensions 9≤n≤16 that support low-complexity transmitter and/or receiver implementations are sought. Traditionally, IEEE 802.11 has only standardized P matrices of even order, and hence particular examples of the present disclosure concern the cases where n=10, 12, 14, 16. P matrices of odd orders can be generated from P matrices of even order by removing one or more rows. In the cases where n=10,14 it is impossible to find orthogonal (±1)-matrices, but it is possible to find orthogonal (±1,0)-matrices. In the cases where n=12,16, it is possible to find orthogonal (±1)-matrices, but it may be preferable to use (±1,0)-matrices instead, because there can be significant complexity reductions at the receiver, since multiplication by zero need not be performed.

A problem related to employing orthogonal (±1,0)-matrices as P matrices is that the total transmit power is decreased with respect to the maximum possible output power, because a 0 in the (m,k) entry in the P matrix implies that the m-th transmitter chain will be muted during the time period corresponding to the k-th LTF.

Examples of this disclosure propose the use of orthogonal (±1,0)-matrices as P matrices, and provide methods to avoid the decrease of transmitter power associated with the presence of zeros (0's) in the P matrix. Generally, examples of this disclosure propose to apply different P matrices for different subcarriers. The P matrices may be chosen in some examples based on two criteria.

1) For every transmitter chain and every LTF there is at least one subcarrier whose associated P matrix has a non-zero entry in the column and row indicated by said transmitter chain and said LTF.
2) The various P matrices may all be related to each other and/or to a base P matrix.

For example, the result of multiplication of a vector by any P matrix can be computed by multiplying the vector by the base P matrix followed by the application of an operation with negligible complexity.

The first criterion may ensure that no transmitter chain is muted during the transmission of the LTFs. By properly scaling the signals, the maximum output power can be used in all TX chains. The second criterion may ensure that it is not necessary to have circuitry or software that implements multiplication by more than one P matrix.

Thus, examples of this disclosure propose orthogonal cover codes that enable IEEE 802.11 to support from 9 to 16 space time streams. Example proposed orthogonal cover codes are defined in terms of (±1,0)-matrices which support the implementation of efficient channel estimation algorithms at the receiver. Examples are given which show favorable computational complexity when compared to other efficient algorithms such as the Fast Hadamard Transform and the Fast Fourier Transform.

Examples of this disclosure propose to utilize (±1,0)-matrices as P matrices. It may be desirable to utilize as P matrices orthogonal (±1)-matrices of orders n=10 and n=14, but such matrices do not exist. An alternative may be to employ orthogonal (±1,0)-matrices as P matrices, such as for example conference matrices.

Figure 1:
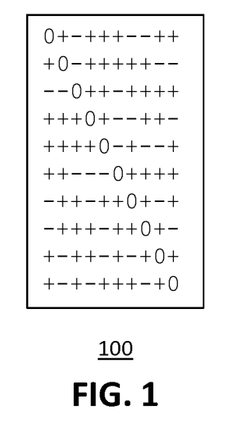
FIG. 1 shows an example of a conference matrix of order n=10.
Figure 2:
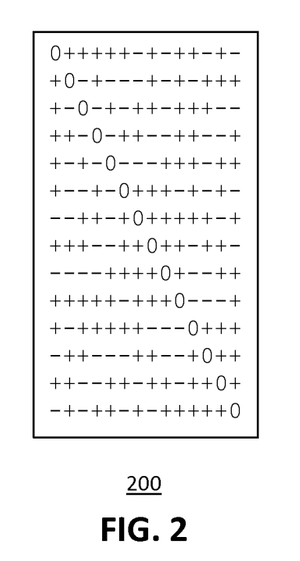
FIG. 2 shows an example of a conference matrix of order n=14.

FIG. 1 shows an example of a conference matrix 100 of order n=10. FIG. 2 shows an example of a conference matrix 200 of order n=14. These matrices are referred to as $P_{10}$ and $P_{14}$ respectively hereinafter. In FIGS. 1 and 2, a minus sign (−) represents the value −1, whereas a plus sign (+) represents the value +1. In other examples, the minus sign and plus sign may represent any negative and positive value, respectively, and/or any complex value (including unity magnitude complex values). A zero (0) in the matrix represents the value zero.

Further, although it is known that (±1)-matrices of orders n=12 and n=16 exist and fast matrix multiplication algorithms are available, it may be desirable to design P matrices that have even lower matrix multiplication complexity, in order to support the reduction of cost, silicon area, power consumption, and/or computation time in transmitters and/or receivers. One way to accomplish this is to employ (±1,0)-matrices as P matrices for orders n=12 and n=16.

Figure 3:
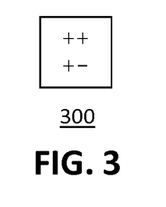
FIG. 3 shows an example of a P matrix of order n=2.
Figure 4:
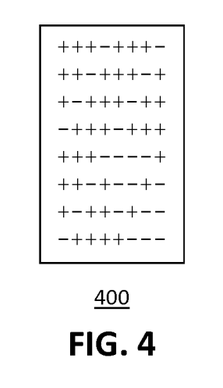
FIG. 4 shows an example of a P matrix of order n=8.

The IEEE 802.11-16 standard defines P matrices $P_2$ and $P_8$ of orders 2 and 8 respectively, which can be used to derive P matrices of higher orders. These matrices 300 and 400 are shown in FIGS. 3 and 4 respectively.

Figure 5A:
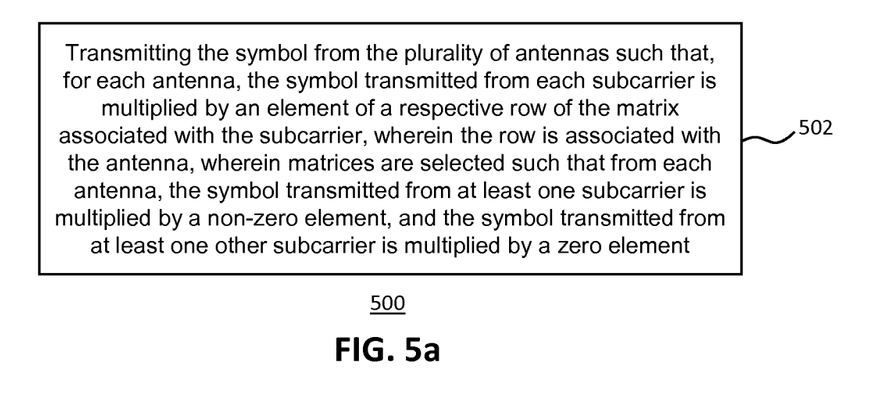
FIG. 5a is a flow chart of an example of a method of transmitting a multicarrier symbol.

FIG. 5a is a flow chart of an example of a method 500 of transmitting a multicarrier symbol. The multicarrier symbol comprises a plurality of subcarriers, and the symbol is transmitted simultaneously from a plurality of antennas. Each subcarrier is associated with a respective orthogonal matrix. For example, there are at least two different orthogonal matrices.

The method 500 comprises, in step 502, transmitting the symbol from the plurality of antennas such that, for each antenna, the symbol transmitted from each subcarrier is multiplied by an element of a respective row of the matrix associated with the subcarrier, wherein the row is associated with the antenna. The matrices are selected such that from each antenna, the symbol transmitted from at least one subcarrier is multiplied by a non-zero element, and the symbol transmitted from at least one other subcarrier is multiplied by a zero element. Thus, for example, for the symbol transmitted simultaneously from multiple antennas, at least one subcarrier from each antenna is multiplied by a zero element, thus reducing complexity at the transmitter and/or receiver, whereas at least one subcarrier from each antenna is multiplied by a non-zero element, allowing full power to be transmitted from each antenna (e.g. increasing power to non-zero subcarriers where some subcarriers are multiplied by zero).

In some examples of the method 500, for each subcarrier, the symbol transmitted from each antenna is multiplied by a respective element of a column of the matrix associated with the subcarrier. In some examples, for each subcarrier, the symbol transmitted from each antenna is multiplied by different elements of the column of the matrix associated with the subcarrier.

Figure 5B:
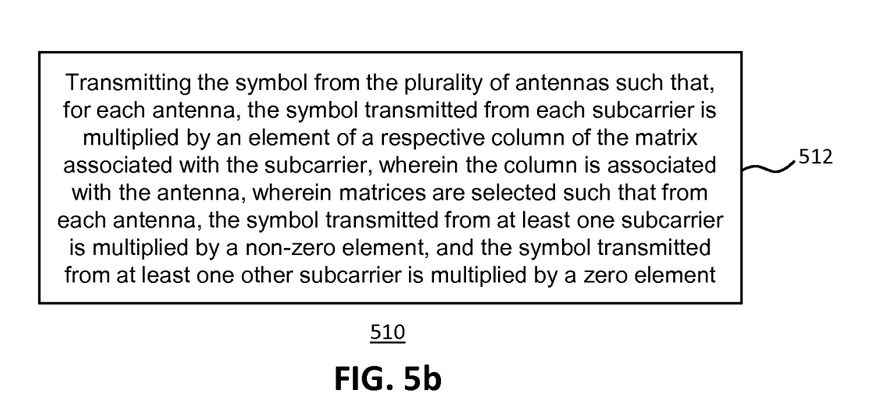
FIG. 5b is a flow chart of an example of a method of transmitting a multicarrier symbol.

FIG. 5b is a flow chart of an example of a method 510 of transmitting a multicarrier symbol. The multicarrier symbol comprises a plurality of subcarriers, and the symbol is transmitted simultaneously from a plurality of antennas. Each subcarrier is associated with a respective orthogonal matrix. For example, there are at least two different orthogonal matrices.

The method 510 comprises, in step 512, transmitting the symbol from the plurality of antennas such that, for each antenna, the symbol transmitted from each subcarrier is multiplied by an element of a respective column of the matrix associated with the subcarrier, wherein the column is associated with the antenna. The matrices are selected such that from each antenna, the symbol transmitted from at least one subcarrier is multiplied by a non-zero element, and the symbol transmitted from at least one other subcarrier is multiplied by a zero element. Thus, for example, for the symbol transmitted simultaneously from multiple antennas, at least one subcarrier from each antenna is multiplied by a zero element, thus reducing complexity at the transmitter and/or receiver, whereas at least one subcarrier from each antenna is multiplied by a non-zero element, allowing full power to be transmitted from each antenna (e.g. increasing power to non-zero subcarriers where some subcarriers are multiplied by zero).

In some examples of the method 510, for each subcarrier, the symbol transmitted from each antenna is multiplied by a respective element of a row of the matrix associated with the subcarrier. In some examples, for each subcarrier, the symbol transmitted from each antenna is multiplied by different elements of the row of the matrix associated with the subcarrier.

Examples and features disclosed herein may be applicable where appropriate to both method 500 and method 510.

In some examples, the matrix associated with each subcarrier can be obtained by multiplication of a permutation matrix by an orthogonal base matrix or the matrix associated with at least one other subcarrier. In some examples, the matrices are obtained in this manner, whereas in other examples this is merely the relation between the matrices, and the matrices may be obtained in any suitable manner, e.g. circular shifts or reordering, as described below.

Figure 6:
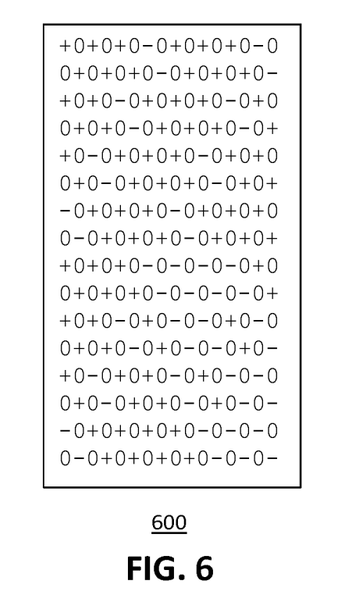
FIG. 6 shows an example of an orthogonal (±1,0)-matrix of order n=16.
Figure 7:
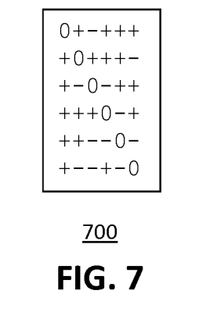
FIG. 7 shows an example of a conference matrix of order n=6.
Figure 8:
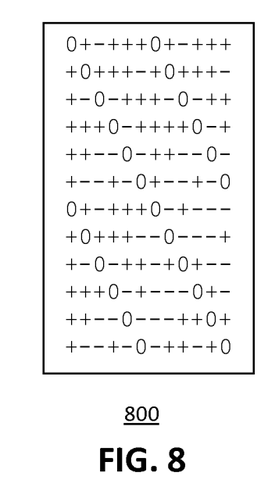
FIG. 8 shows an example of an orthogonal (±1,0)-matrix of order n=12.

In an example, a highly structured orthogonal (±1,0)-matrix $P_{16}$ of order 16 can be generated according to the formula $P_{16}=P_8 \otimes I_2$, where $\otimes$ denotes the Kronecker matrix product. This matrix 600 is illustrated in FIG. 6. A structured, orthogonal (±1,0)-matrix $P_{12}$ of order 12 can be generated from the matrix $P_2$ 300 shown in FIG. 3 and the conference matrix 700 $U_6$ shown in FIG. 7 by the formula $P_{12}=P_2 \otimes U_6$. This matrix $P_{12}$ 800 is shown in FIG. 8.

In some examples of this disclosure, orthogonal (±1,0)-matrices are employed as P matrices. A problem that arises when employing orthogonal (±1,0)-matrices as P matrices is that the total transmit power is decreased with respect to the maximum possible output power, because a 0 in the entry (m,k) of the P matrix implies that the m-th transmitter chain is muted during the time period corresponding to the k-th LTF. In order to solve this problem, it is proposed to apply subcarrier-specific P matrices. That is, different P matrices may be applied to different subcarriers. In particular examples, for any transmitter chain m and any LTF symbol k, there is at least one P matrix whose corresponding entry for m and k (for example, the entry in the mth row and kth column for a particular example arrangement of elements in the matrix) is non-zero. This ensures that no transmitter chain is muted during the transmission of LTFs. Furthermore, it is proposed in some examples to derive all the P matrices from a base P matrix (which in some examples may be the P matrix associated with one of the subcarriers) in such a way that matrix multiplication by any P matrix can be calculated for example from the calculation of matrix multiplication by the base matrix. This may ensure for example that software units and/or circuitry employed to compute the product of the base matrix by a vector can be re-used.

One way to generate new P matrices from a base P matrix is by multiplying the base P matrix by a permutation matrix. A permutation is simply a reordering of rows and/or columns of a matrix. In an example, a permutation matrix G of order n is a (1,0)-matrix that has the property that each column and each row comprises exactly one element having value 1 while the remaining entries are zero. A first example of a permutation matrix is the time reversal matrix that has elements of value 1 along the anti-diagonal and elements of value 0 (i.e. zeros) everywhere else. A second example of a permutation matrix is the circular shift matrix. Note that a circular shift is a linear operation and hence can be described in terms of a matrix. A circular shift by one step can be described by the matrix $C_n$ of order n that has zeros I all elements, except at the sub-diagonal and in the last element of the first row, where it is 1 (i.e. all the entries of $C_n$ are zero, except $C_n(i+1,i)=1$, $C_n(1,n)=1$). With this notation, a circular shift by k steps $C_n^{(k)}$ is given by:

$$C_n^{(k)} := \begin{cases} \prod_{i=1}^{k} C_n & \text{if } k > 0 \\ I_n & \text{if } k = 0 \\ \prod_{i=1}^{n-|k|} C_n & \text{if } k < 0 \end{cases}$$

Note also that there is periodicity: $G_n^{(n+k)}=G_n^{(k)}$. In other words, applying n consecutive one-step circular shifts to a vector of length n results in the original vector. Any permutation matrix G has the property that $G \cdot G^T = I_n$. Therefore, if $P_n$ is an orthogonal matrix of order n and G is a permutation matrix of the same order, then the product $G \cdot P_n$ is also orthogonal matrix $(G \cdot P_n)(G \cdot P_n)^H = G \cdot P_n \cdot P_n^H \cdot G^T = G \cdot G^T = I_n$. Note also that the product of the matrix $G \cdot P_n$ and a vector $\vec{r}$ of received samples is $(G \cdot P_n) \cdot \vec{r} = G \cdot (P_n \cdot \vec{r})$. Therefore, in some examples, the product of the vector by the base matrix $P_n \cdot \vec{r}$ may be computed, and then the results reordered, to provide the same result as the product of the vector by a particular matrix (where the particular matrix is the product of the base matrix and a permutation matrix).

In some examples, all of the matrices are different, though in other examples there may be fewer different matrices than the number of subcarriers, e.g. at least two different matrices. For example, a first set of subcarriers is associated with a first matrix, and a second subset of subcarriers different to the first subset is associated with a second matrix different to the first subset. In other examples, there may be further subset(s) of subcarriers, each associated with another, different matrix.

Figure 9:
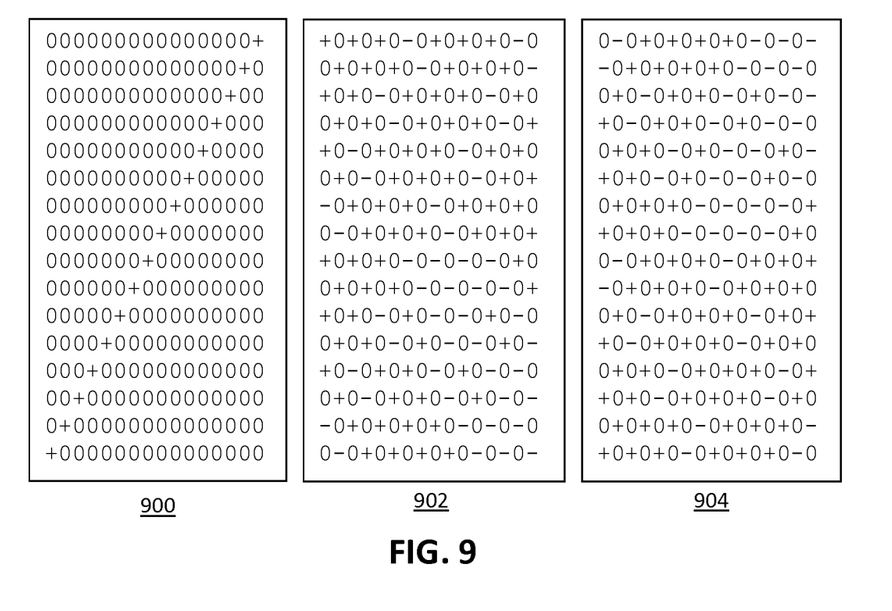
FIG. 9 shows an example of a permutation matrix and P matrices of order n=16.

In a particular example, consider the case of order n=16 (e.g. there are 16 antennas). The matrix $P_{16}$ 600 shown in FIG. 9 may be selected as base matrix, and a permutation matrix G may be a time reversal matrix. The P matrices $P^{(k)}$ for any integer k may be defined as follows:

$$P^{(k)} = \begin{cases} P_{16} & \text{if } k \text{ is even} \\ G \cdot P_{16} & \text{if } k \text{ is odd} \end{cases}.$$

Further, the P matrix $P^{(k)}$ may be associated with subcarrier number k (e.g. the subcarrier having frequency $(k\Delta f + F_c)$, where $\Delta f$ is the subcarrier spacing and $F_c$ the center frequency). FIG. 9 shows the permutation matrix 900 and the two P matrices 902 (for even k) and 904 (for odd k). In some examples, it is possible to boost (e.g. by 3 dB) the LTF symbols in all transmitter chains, since half of the subcarriers are muted at any given time during transmission of the LTFs from each transmitter. Note also that, for example, multiplying a vector by $P^{(k)}$ with even k is equivalent to multiplying the vector by $P^{(k)}$ with odd k and reading the result in the opposite order (last entry first, first entry last). Reading in the opposite order may in some examples be implemented with no complexity increase (using e.g. pointer arithmetic and configuring the pointers so that the data is traversed in the correct order).

Figure 10:
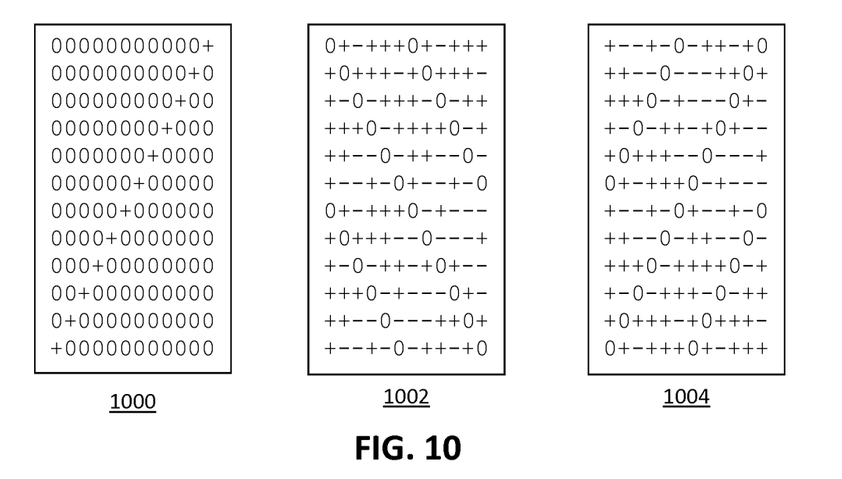
FIG. 10 shows an example of a permutation matrix and P matrices of order n=12.

In another example, consider the case of order n=12 (e.g. there are 12 transmit antennas). The matrix $P_{12}$ 800 shown in FIG. 8 is chosen as a base matrix, a time reversal matrix is chosen as a permutation matrix, and the P matrices $P^{(k)}$ for any integer k are defined as follows:

$$P^{(k)} = \begin{cases} P_{12} & \text{if } k \text{ is even} \\ G \cdot P_{12} & \text{if } k \text{ is odd} \end{cases}.$$

Further, the P matrix $P^{(k)}$ is associated with subcarrier number k. FIG. 10 illustrates the permutation matrix 1000 and the two P matrices 1002 (for even k) and 1004 (for odd k). Unlike the previous example, there are LTFs and transmitter chains where no subcarrier is muted. For example, $P^{(k)}(2,1)=1$ for all k. This means that the second transmitter chain is never muted for any subcarrier during the transmission of the first LTF. Therefore, for example, it is not necessary to power boost the signals corresponding to such LTFs and transmitted through those transmitter chains. On the other hand, some of the subcarriers are muted in LTFs and transmitter chains corresponding to 0 entries in a P matrix. For example, $P^{(1)}(3,4)=0$, while $P^{(2)}(3,4)=-1$. This implies that the third transmitter chain will mute half of the subcarriers during the transmission of the fourth LTF. Hence, for example, it is possible to boost this LTF by 3 dB. Similarly, for example, if for a certain subcarrier an LTF is muted in a certain transmitter chain in due to the corresponding entry in the P matrix being zero, the LTF can be boosted by 3 dB in that transmitter chain.

Figure 11:
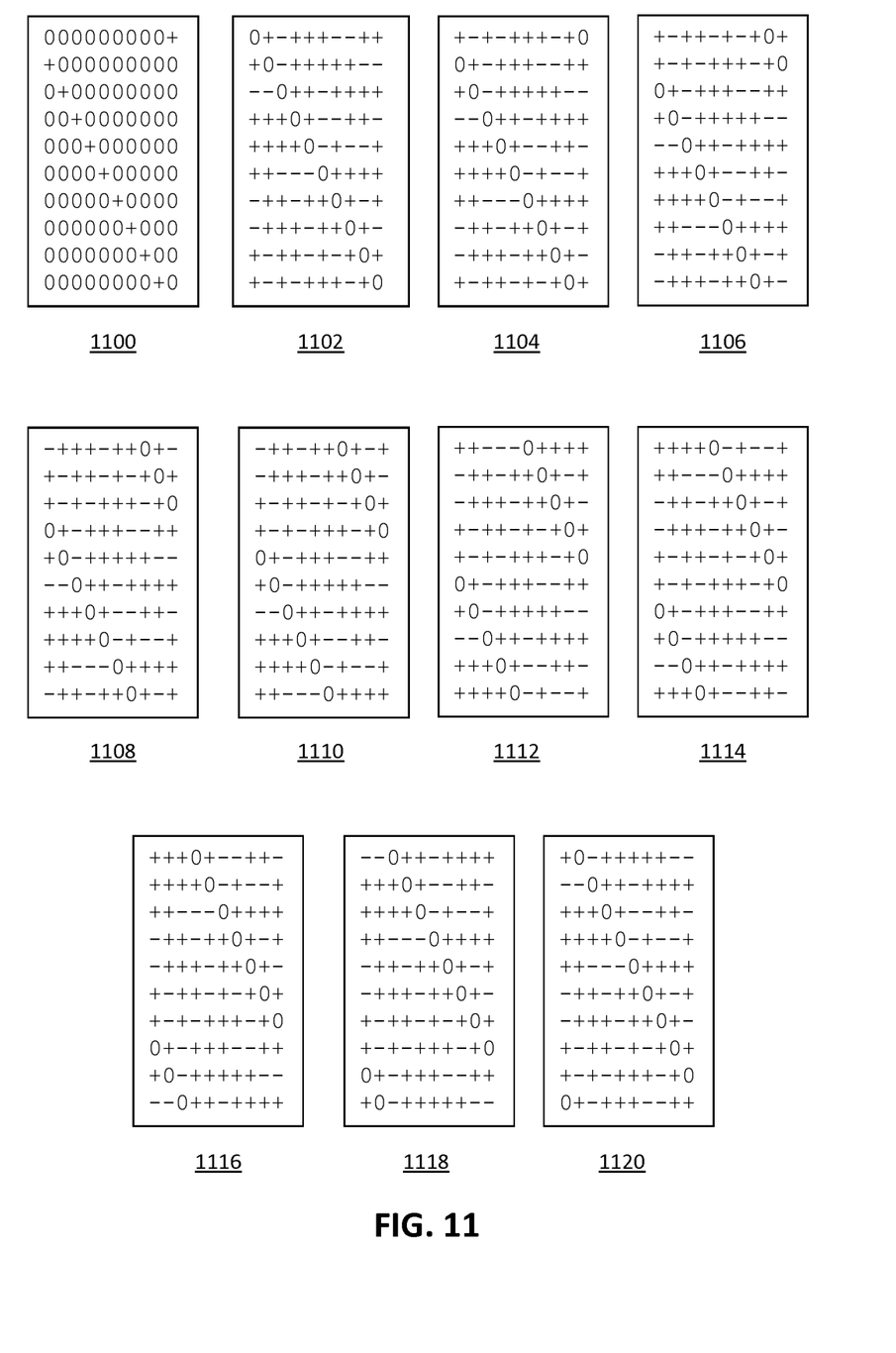
FIG. 11 shows an example of a permutation matrix and P matrices of order n=10.

In another example, consider the case of order n=10. The matrix $P_{10}$ 100 shown in FIG. 1 is chosen as the base matrix, and the cyclic shift matrices $C_{10}^{(k)}$ are chosen as permutation matrices. The P matrices $P^{(k)}$ are defined for any integer k as follows:

$$P^{(k)}=C_{10}^{(k)} \cdot P_{10}$$

Note that for any k, $P^{(k)}=P^{(k+10)}$ so that there are only 10 different P matrices. FIG. 11 shows the permutation matrix 1100 and the P matrices 1102 to 1120 corresponding to values of k of 0 to 9 respectively.

Further, the P matrix $P^{(k)}$ may be associated with subcarrier k. Note in each transmitter chain, one tenth of the subcarriers in each LTF are muted because for any row r and any column c there is only one k such that $P^{(k)}(c,r)=0$. Hence, a power boost of $10*\log 10(10/9)=0.46$ dB can be applied in some examples to each transmitter chain for all LTFs. In addition, multiplication by any P matrix is equivalent to multiplication by the base matrix followed by a cyclic shift of the result. Therefore, in some examples, applying a cyclic shift to a vector can be implemented very efficiently, for example with little or no increase in complexity (compared to cases where subcarriers are not associated with respective matrices, for example) since the result can be read using circular pointer arithmetic.

In another example, consider the case of order n=14. The matrix $P_{14}$ 200 shown in FIG. 2 is chosen as the base matrix, and the cyclic shift matrices are chosen as permutation matrices. The P matrices $P^{(k)}$ are defined for any integer k as follows:

$$P^{(k)}=C_{14}^{(k)} \cdot P_{14}.$$

Note that for any k, $P^{(k)}=P^{(k+14)}$, so that there are only 14 different matrices. In each transmitter chain (i.e. from each antenna), one fourteenth of the subcarriers in each LTF are muted (i.e. the corresponding element of the corresponding P matrix is zero). Hence, a power boost of $10*\log 10(14/13)=0.32$ dB can be applied to all transmitter chains in some examples. In addition, multiplication by any P matrix is equivalent to multiplication by the base matrix followed by a cyclic shift of the result. Applying a cyclic shift to a vector can therefore in some examples be implemented very efficiently, often with little or no increase in complexity.

In some examples, transmitting comprises transmitting, from each antenna, the symbol from the plurality of subcarriers at a predetermined total transmit power or a maximum total transmit power. This may for example take into account any subcarriers that are muted due to a zero element in the appropriate position in the associated matrix.

Referring back to the methods 500 and 510, in some examples, the plurality of antennas comprise at least 10 antennas. Thus the order of the matrices may be at least 10. In some examples, the matrix associated with each antenna comprises a 10×10, 12×12, 14×14 or 16×16 matrix, though odd orders may be used instead, e.g. 9×9, 11×11, 13×13 or 15×15 matrices.

In some examples, each row and/or column of each of the matrices associated with the subcarriers includes at least one zero element. This may contribute to a reduction in hardware and/or computational complexity in the transmitter and/or receiver. In some examples, the matrices are selected such that for each subcarrier, the symbol transmitted from at least one antenna on that subcarrier is multiplied by a non-zero element, and the symbol transmitted from at least one other antenna on that subcarrier is multiplied by a zero element. In some examples, a row and/or column of each of the matrices associated with the subcarriers includes at least one complex non-zero element.

Figure 12:
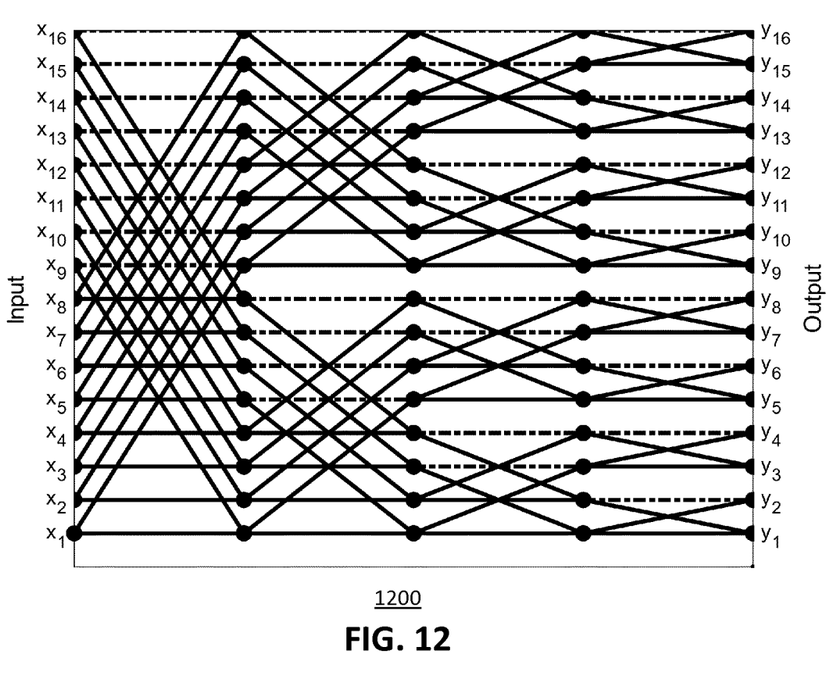
FIG. 12 shows an example of a butterfly diagram corresponding to multiplication by the Hadamard matrix of order n=16.
Figure 13:
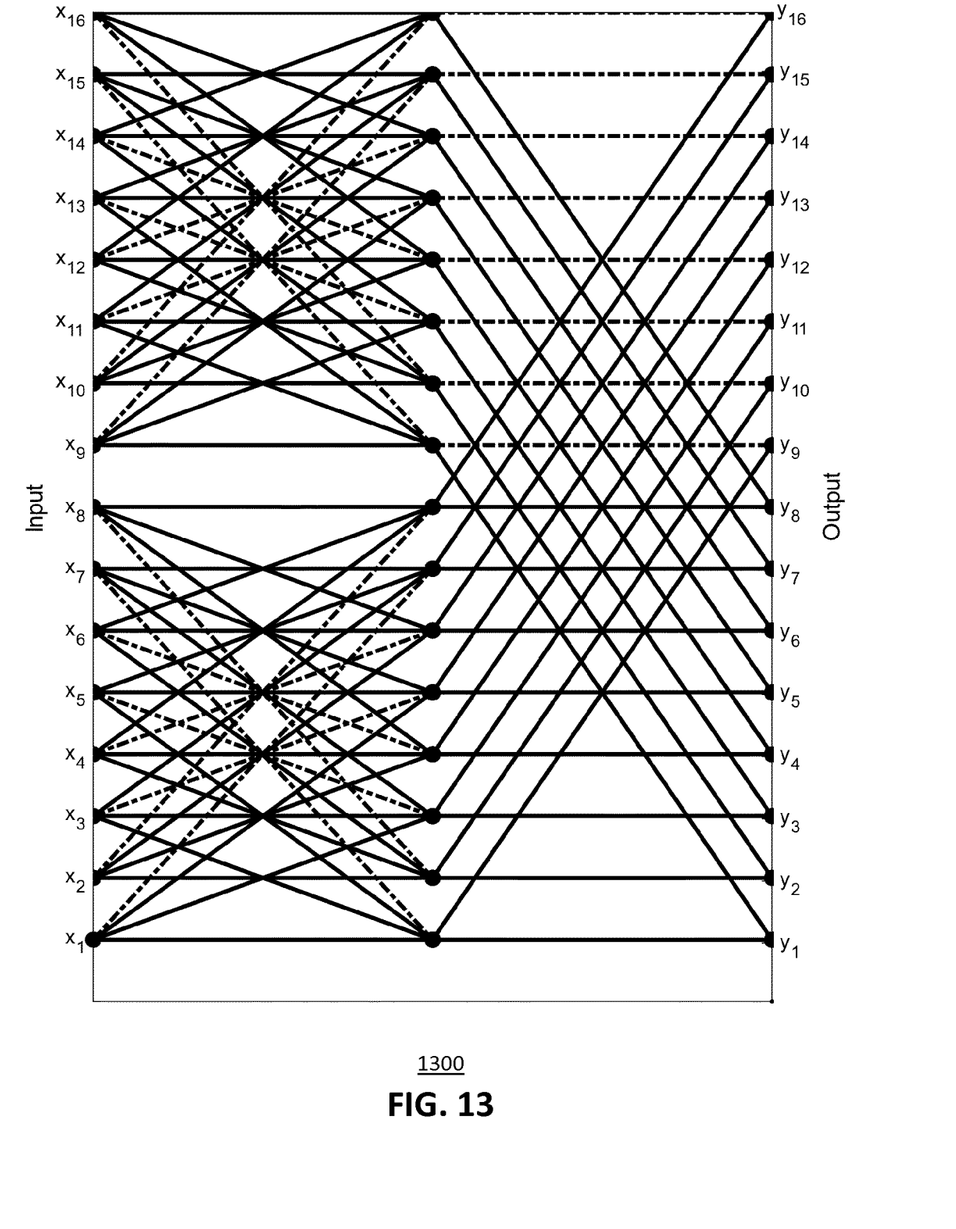
FIG. 13 shows an example of a butterfly diagram corresponding to multiplication by the matrix shown in FIG. 6.

Next, we consider the computational complexity of multiplication by a P matrix. One way to compare the complexity is to draw butterfly diagrams corresponding to multiplication by the matrices and use as figure of merit the total number of edges. A low figure of merit is better than a high figure of merit as it indicates lower computational complexity. As a benchmark we consider the well-known Hadamard matrix $H_{16}$ of order 16 defined by $H_{16}=P_2 \otimes P_2 \otimes P_2 \otimes P_2$, which is known to support extremely efficient implementations, even more efficient than the fast Fourier transform of the same order, since the Hadamard transform does not require any multiplications. A butterfly diagram 1200 representing multiplication by $H_{16}$ is shown in FIG. 12. It has 128 edges. A butterfly diagram 1300 representing multiplication by the matrix $P_{16}$ 600 (shown in FIG. 6) is shown in FIG. 13. It has 96 edges. Hence, the matrix $P_{16}$ has significantly better figure of merit than the Hadamard matrix. Another base matrix having the same figure of merit as $P_{16}$ is $P_{16}^a=P_2 \otimes P_2 \otimes P_2 \otimes I_2$, which has the same symmetries inherited from the Kronecker product construction as $H_{16}$, but has more zeros than $H_{16}$ and hence, like $P_{16}$ supports multiplication algorithms even faster than the Fast Hadamard transform. Similarly, other matrices of different order may be shown to have better figures of merit than a FFT of the same order.

Figure 14:
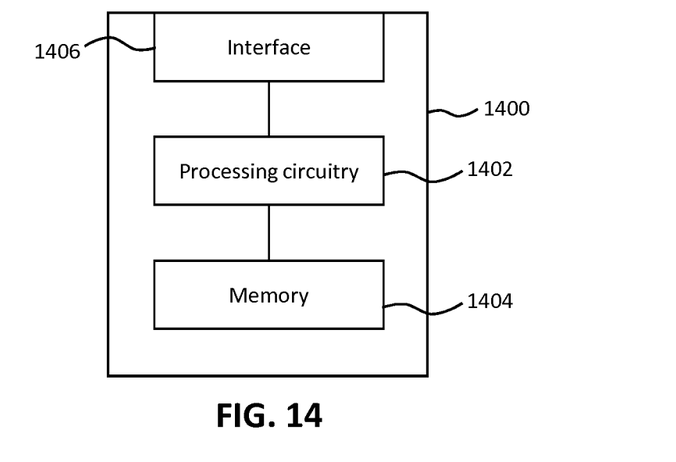
FIG. 14 is a schematic of an example of apparatus for transmitting a multicarrier symbol.

FIG. 14 is a schematic of an example of apparatus 1400 for transmitting a multicarrier symbol comprising a plurality of subcarriers simultaneously from a plurality of antennas, wherein each subcarrier is associated with a respective orthogonal matrix. The apparatus 1400 comprises processing circuitry 1402 (e.g. one or more processors) and a memory 1404 in communication with the processing circuitry 1402. The memory 1404 contains instructions executable by the processing circuitry 1402. The apparatus 1400 also comprises an interface 1406 in communication with the processing circuitry 1402. Although the interface 1406, processing circuitry 1402 and memory 1404 are shown connected in series, these may alternatively be interconnected in any other way, for example via a bus.

In one embodiment, the memory 1404 contains instructions executable by the processing circuitry 1402 such that the apparatus 1400 is operable to transmit the symbol from the plurality of antennas such that, for each antenna, the symbol transmitted from each subcarrier is multiplied by an element of a respective row of the matrix associated with the subcarrier, wherein the row is associated with the antenna.

The matrices are selected such that from each antenna, the symbol transmitted from at least one subcarrier is multiplied by a non-zero element, and the symbol transmitted from at least one other subcarrier is multiplied by a zero element. In some examples, the apparatus 1400 is operable to carry out the method 500 described above with reference to FIG. 5*a*.

Figure 15:
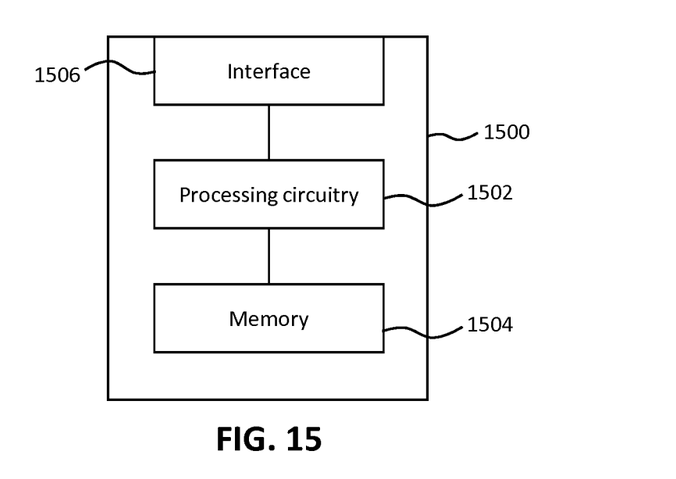
FIG. 15 is a schematic of an example of apparatus for transmitting a multicarrier symbol.

FIG. 15 is a schematic of an example of apparatus 1500 for transmitting a multicarrier symbol comprising a plurality of subcarriers simultaneously from a plurality of antennas, wherein each subcarrier is associated with a respective orthogonal matrix. The apparatus 1500 comprises processing circuitry 1502 (e.g. one or more processors) and a memory 1504 in communication with the processing circuitry 1502. The memory 1504 contains instructions executable by the processing circuitry 1502. The apparatus 1500 also comprises an interface 1506 in communication with the processing circuitry 1502. Although the interface 1506, processing circuitry 1502 and memory 1504 are shown connected in series, these may alternatively be interconnected in any other way, for example via a bus.

In one embodiment, the memory 1504 contains instructions executable by the processing circuitry 1502 such that the apparatus 1500 is operable to transmit the symbol from the plurality of antennas such that, for each antenna, the symbol transmitted from each subcarrier is multiplied by an element of a respective column of the matrix associated with the subcarrier, wherein the column is associated with the antenna. The matrices are selected such that from each antenna, the symbol transmitted from at least one subcarrier is multiplied by a non-zero element, and the symbol transmitted from at least one other subcarrier is multiplied by a zero element. In some examples, the apparatus 1500 is operable to carry out the method 510 described above with reference to FIG. 5*b*.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of transmitting symbols from a plurality of antennas in a wireless communication system, the method comprising:
transmitting each of one or more symbols simultaneously from the plurality of antennas, wherein:
each symbol comprises a plurality of subcarriers;
the plurality of subcarriers are associated with a respective plurality of orthogonal matrices;
one of the plurality of orthogonal matrices associated with one of the plurality of subcarriers is different than at least one other of the plurality of orthogonal matrices associated with at least one other of the plurality of subcarriers;
respective portions of each matrix are associated with the respective antennas; and
the following applies to each particular antenna of the plurality of antennas:
the plurality of subcarriers transmitted from the particular antenna are multiplied by respective elements of an orthogonal matrix portion that is associated with the respective subcarriers and the particular antenna,
at least one subcarrier transmitted from the particular antenna is multiplied by an element that is non-zero, and
at least one other subcarrier transmitted from the particular antenna is multiplied by an element that is zero.

2. The method of claim 1, wherein:
the plurality of subcarriers of each symbol are transmitted simultaneously from the plurality of antennas; and
each particular subcarrier is multiplied by respective elements of a further portion of the orthogonal matrix associated with the particular subcarrier, prior to transmission from the respective antennas.

3. The method of claim 2, wherein one of the following applies:
the respective portions of each orthogonal matrix that are associated with the respective antennas are respective rows, and the further portion is a column; or
the respective portions of each orthogonal matrix that are associated with the respective antennas are respective columns, and the further portion is a row.

4. The method of claim 2, wherein each particular subcarrier is multiplied by:
a non-zero element prior to transmission from at least one of the plurality of antennas, and
a zero element prior to transmission from at least one other of the plurality of antennas.

5. The method of claim 1, wherein the orthogonal matrix associated with each subcarrier is a product of a permutation matrix and one of the following: an orthogonal base matrix, or the orthogonal matrix associated with at least one other subcarrier.

6. The method of claim 1, wherein:
a first subset of subcarriers is associated with a first orthogonal matrix, and
a second subset of subcarriers, different than the first subset, is associated with a second orthogonal matrix that is different than the first orthogonal matrix.

7. The method of claim 1, wherein each symbol transmitted from each antenna is transmitted at one of the following: a predetermined total transmit power, or a maximum total transmit power.

8. The method of claim 1, wherein one or more of the following applies:
the plurality of antennas comprise at least 10 antennas; and
the orthogonal matrix associated with each antenna comprises a 10×10, 12×12, 14×14, or 16×16 matrix.

9. The method of claim 1, wherein the one or more symbols are one of the following: OFDM symbols, or long training field (LTF) symbols.

10. The method claim 1, wherein each portion of each of the orthogonal matrices associated with the respective subcarriers includes at least one zero element.

11. An apparatus configured to transmit symbols from a plurality of antennas in a wireless communication system, the apparatus comprising:

transmitter circuitry operably coupled to the plurality of antennas;
a processing circuitry operably coupled to the transmitter circuitry;
and a non-transitory, computer-readable medium having stored thereon
a computer program that, when executed by the processing circuitry, cause the apparatus to:
transmit each of one or more symbols simultaneously from the plurality of antennas, wherein:
each symbol comprises a plurality of subcarriers;
the plurality of subcarriers are associated with a respective plurality of orthogonal matrices;
one of the plurality of orthogonal matrices associated with one of the plurality of subcarriers is different than at least one other of the plurality of orthogonal matrices associated with at least one other of the plurality of subcarriers;
respective portions of each matrix are associated with the respective antennas; and
the following applies to each particular antenna of the plurality of antennas:
the plurality of subcarriers transmitted from the particular antenna are multiplied by respective elements of an orthogonal matrix portion that is associated with the respective subcarriers and the particular antenna,
at least one subcarrier transmitted from the particular antenna is multiplied by an element that is non-zero, and
at least one other subcarrier transmitted from the particular antenna is multiplied by an element that is zero.

12. The apparatus of claim 11, wherein:
the plurality of subcarriers of each symbol are transmitted simultaneously from the plurality of antennas; and
each particular subcarrier is multiplied by respective elements of a further portion of the orthogonal matrix associated with the particular subcarrier, prior to transmission from the respective antennas.

13. The apparatus of claim 12, wherein one of the following applies:
the respective portions of each orthogonal matrix that are associated with the respective antennas are respective rows, and the further portion is a column; or
the respective portions of each orthogonal matrix that are associated with the respective antennas are respective columns, and the further portion is a row.

14. The apparatus of claim 12, wherein each particular subcarrier is multiplied by:
a non-zero element prior to transmission from at least one of the plurality of antennas, and
a zero element prior to transmission from at least one other of the plurality of antennas.

15. The apparatus of claim 11, wherein the orthogonal matrix associated with each subcarrier is a product of a permutation matrix and one of the following: an orthogonal base matrix, or the orthogonal matrix associated with at least one other subcarrier.

16. The apparatus of claim 11, wherein:
a first subset of subcarriers is associated with a first orthogonal matrix, and a second subset of subcarriers, different than the first subset, is associated with a second orthogonal matrix that is different than the first orthogonal matrix.

17. The apparatus of claim 11, wherein each symbol transmitted from each antenna is transmitted at one of the following: a predetermined total transmit power, or a maximum total transmit power.

18. The apparatus of claim 11, wherein one or more of the following applies:
the plurality of antennas comprise at least 10 antennas; and
the orthogonal matrix associated with each antenna comprises a 10×10, 12×12, 14×14, or 16×16 matrix.

19. The apparatus of claim 11, wherein the one or more symbols are one of the following: OFDM symbols, or long training field (LTF) symbols.

20. The apparatus claim 11, wherein each portion of each of the orthogonal matrices associated with the respective subcarriers includes at least one zero element.

21. A non-transitory, computer-readable media having stored thereon a computer program that, when executed by processing circuitry of a transmitter apparatus, cause the transmitter apparatus to perform operations corresponding to the method of claim 1.

* * * * *